United States Patent
Miyashita

(10) Patent No.: US 10,014,736 B2
(45) Date of Patent: Jul. 3, 2018

(54) PERMANENT MAGNET-EMBEDDED MOTOR AND ROTOR THEREOF

(71) Applicant: SANYO DENKI CO., LTD., Tokyo (JP)

(72) Inventor: Toshihito Miyashita, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 63 days.

(21) Appl. No.: 14/031,467

(22) Filed: Sep. 19, 2013

(65) Prior Publication Data
US 2014/0084735 A1    Mar. 27, 2014

(30) Foreign Application Priority Data
Sep. 21, 2012 (JP) .................. 2012-208206

(51) Int. Cl.
H02K 21/12    (2006.01)
H02K 1/27    (2006.01)

(52) U.S. Cl.
CPC .................. H02K 1/276 (2013.01)

(58) Field of Classification Search
CPC .................. H02K 1/27; H02K 21/12
USPC ............ 310/156.01, 156.52, 156.53, 156.63, 310/156.65
See application file for complete search history.

(56) References Cited

U.S. PATENT DOCUMENTS

| | | | |
|---|---|---|---|
| 6,727,627 B1 | 4/2004 | Sasaki et al. | |
| 2003/0090167 A1* | 5/2003 | Kajiura et al. | 310/156.36 |
| 2004/0169431 A1 | 9/2004 | Sasaki et al. | |
| 2005/0121991 A1 | 6/2005 | Sasaki et al. | |
| 2006/0119205 A1 | 6/2006 | Sasaki et al. | |
| 2007/0108862 A1 | 5/2007 | Sasaki et al. | |
| 2007/0145851 A1* | 6/2007 | Kikuchi | H02K 21/46 310/156.78 |
| 2009/0200885 A1* | 8/2009 | Kikuchi | B22F 1/02 310/156.78 |
| 2010/0052463 A1 | 3/2010 | Saito et al. | |
| 2011/0030419 A1* | 2/2011 | Kikuchi | F04B 35/04 62/498 |
| 2011/0127859 A1 | 6/2011 | Amrhein et al. | |
| 2012/0098376 A1 | 4/2012 | Ombach et al. | |
| 2012/0139386 A1 | 6/2012 | Murakami | |
| 2013/0154426 A1* | 6/2013 | Melfi | H02K 21/46 310/156.78 |

FOREIGN PATENT DOCUMENTS

CN    101938171 A    1/2011
DE    102008042100 A1    3/2010
(Continued)

OTHER PUBLICATIONS

European Search Report dated Oct. 6, 2015 for the corresponding European Patent Application No. 13184921.8.
(Continued)

Primary Examiner — Jose Gonzalez Quinone
(74) Attorney, Agent, or Firm — Polsinelli PC

(57) ABSTRACT

In a rotor of a permanent magnet-embedded motor, a plurality of permanent magnets is arranged in one magnet housing of a rotor core. A rib portion which connects an outer peripheral portion of the rotor core with an inner peripheral portion of the rotor core is arranged per plurality of magnetic poles.

12 Claims, 7 Drawing Sheets

(56) References Cited

FOREIGN PATENT DOCUMENTS

| EP | 2270954 A2 | * | 1/2011 | ............ H02K 1/276 |
|----|------------|---|--------|--------------------------|
| EP | 2270954 A2 |   | 1/2011 | |
| EP | 2270955 A2 |   | 1/2011 | |
| EP | 2463988 A2 |   | 6/2012 | |
| JP | 09308195 A | * | 11/1997 | |
| JP | 2003-061283 A |   | 2/2003 | |
| JP | 3592948 B2 |   | 11/2004 | |
| JP | 3835231 B2 |   | 10/2006 | |
| JP | 2007053864 A | * | 3/2007 | |
| JP | 2007053864 A |   | 3/2007 | |
| JP | 2009-284588 A |   | 12/2009 | |

OTHER PUBLICATIONS

JP OA dated Dec. 15, 2015 for corresponding JP Patent Application No. 2012-208206.
Office Action dated Oct. 9, 2016 issued in Chinese Patent Application No. 201310424370.3, pp. 1-6.
Office Action dated Jan. 8, 2018 issued in the corresponding Korean Patent Application No. 10-2013-011538, pp. 1-4.
Office Action dated Jun. 14, 2016 from Japanese Patent Application No. 2012-208206, pp. 1-3.

\* cited by examiner

PERMANENT MAGNET-EMBEDDED MOTOR AND ROTOR THEREOF

CROSS-REFERENCE TO RELATED APPLICATION

This application claims priority to Japanese Application No. 2012-208206, filed Sep. 21, 2012, the entirety of which is incorporated herein by reference.

BACKGROUND

1. Technical Field

The present invention relates to a rotor in which the structure of permanent magnets embedded in a rotor core is improved, and a permanent magnet-embedded motor.

2. Description of Related Arts

A permanent magnet-embedded motor (interior permanent magnet (IPM) motor) has a structure in which a plurality of permanent magnets is evenly embedded inside a rotor core in a circumferential direction. However, the IPM motor has a problem in that apart of magnetic flux of the permanent magnet short-circuits the inside of the rotor core, thereby reducing torque.

As a technology of improving the torque of the IPM motor, an IPM motor is disclosed in which the torque is improved by setting a ratio of an outer radius R0 of the rotor and an innermost radius R1 of the permanent magnet to R1/R0>0.85 (see Japanese Patent No. 3592948, for example).

Also, another IPM motor is disclosed in which the torque is improved by using two or more permanent magnets for one magnetic pole (see Japanese Patent No. 3835231, for example).

Incidentally, according to the technology of Japanese Patent No. 3592948, a rotor core form includes a rib portion which connects an outer peripheral portion and an inner peripheral portion of the rotor core, in which the width of the rectangular permanent magnet has a limit value determined by combination of the ratio R1/R0 and the thickness of the rib portion. Due to the limit value, the amount of magnetic flux of the permanent magnet is limited. Further, there are numerous short-circuit fluxes in the permanent magnet via the rib portion, thereby reducing the torque.

Also, according to the technology in Japanese Patent No. 3835231, numerous permanent magnets are used and the cost is increased not only for the permanent magnets but also for manufacturing.

The present invention has been made in view of the foregoing circumstances, and an object of the present invention is to provide a permanent magnet-embedded motor and a rotor thereof, capable of reducing the short-circuit flux of the permanent magnet and improving the torque without increasing the manufacturing cost.

SUMMARY

To achieve the above-mentioned object, a permanent magnet-embedded motor according to an embodiment of the present invention has a structure in which permanent magnets are embedded in a plurality of magnet housings of a rotor core.

A plurality of permanent magnets is arranged in each of the magnet housings. A rib portion connecting an outer peripheral portion of the rotor core with an inner peripheral portion of the rotor core is arranged per plurality of magnetic poles.

According to an embodiment of the present invention, the rib portion connecting the outer peripheral portion of the rotor core with the inner peripheral portion of the rotor core is arranged per plurality of magnetic poles. By thus arranging a rib portion per plurality of magnetic poles, the number of the short-circuited magnetic paths may be reduced. As a result, the short-circuit flux of the permanent magnet may be reduced and the torque may be improved without increasing the manufacturing cost.

BRIEF DESCRIPTION OF THE DRAWINGS

FIGS. 2A, 2B, and 2C are views for describing a rotor of the permanent magnet-embedded motor according to the first embodiment, wherein FIG. 2A is a front view of a rotor core sheet, FIG. 2B is a perspective view of a rotor core, and FIG. 2C is a view illustrating the embedded permanent magnets;

FIGS. 3A and 3B are views illustrating flows of short-circuit fluxes of the permanent magnet and the width of the permanent magnet in order to compare the rotor core form according to the structure in the related art with the rotor core form according to the first embodiment, wherein FIG. 3A is a view of the rotor core form according to the structure in the related art, and FIG. 3B is a view of the rotor core form according to the first embodiment;

FIGS. 4A, 4B, and 4C are views for describing a rotor of a permanent magnet-embedded motor according to a second embodiment, wherein FIG. 4A is a perspective view of a rotor core sheet, FIG. 4B is a perspective view of a half-cut rotor core, and FIG. 4C is a view illustrating the embedded permanent magnets;

FIGS. 5A, 5B, and 5C are views for describing a rotor of a permanent magnet-embedded motor according to a third embodiment, wherein FIG. 5A is a front view of a rotor core sheet, FIG. 5B is a perspective view of a rotor core, and FIG. 5C is a view illustrating the embedded permanent magnets;

FIGS. 6A, 6B, and 6C are views for describing a rotor of a permanent magnet-embedded motor according to a fourth embodiment, wherein FIG. 6A is a perspective view of a rotor core sheet, FIG. 6B is a perspective view of a half-cut rotor core, and FIG. 6C is a view illustrating the embedded permanent magnets; and FIGS. 7A, 7B, and 7C are views for describing a rotor of a permanent magnet-embedded motor having the structure in the related art, wherein FIG. 7A is a front view of a rotor core sheet, FIG. 7B is a perspective view of a rotor core, and FIG. 7C is a view illustrating the embedded permanent magnets.

DETAILED DESCRIPTION

Hereinafter, permanent magnet-embedded motors according to the first to fourth embodiments will be described with reference to the drawings.

The permanent magnet-embedded motors according to the first to fourth embodiments reduce the short-circuit flux of the permanent magnet and improve the torque without increasing the manufacturing cost by arranging a rib portion, which connects an outer peripheral portion of a rotor core with an inner peripheral portion of the rotor core, per plurality of magnetic poles.

First Embodiment

<Structures of Permanent Magnet-Embedded Motor and Rotor>

Figure 1:
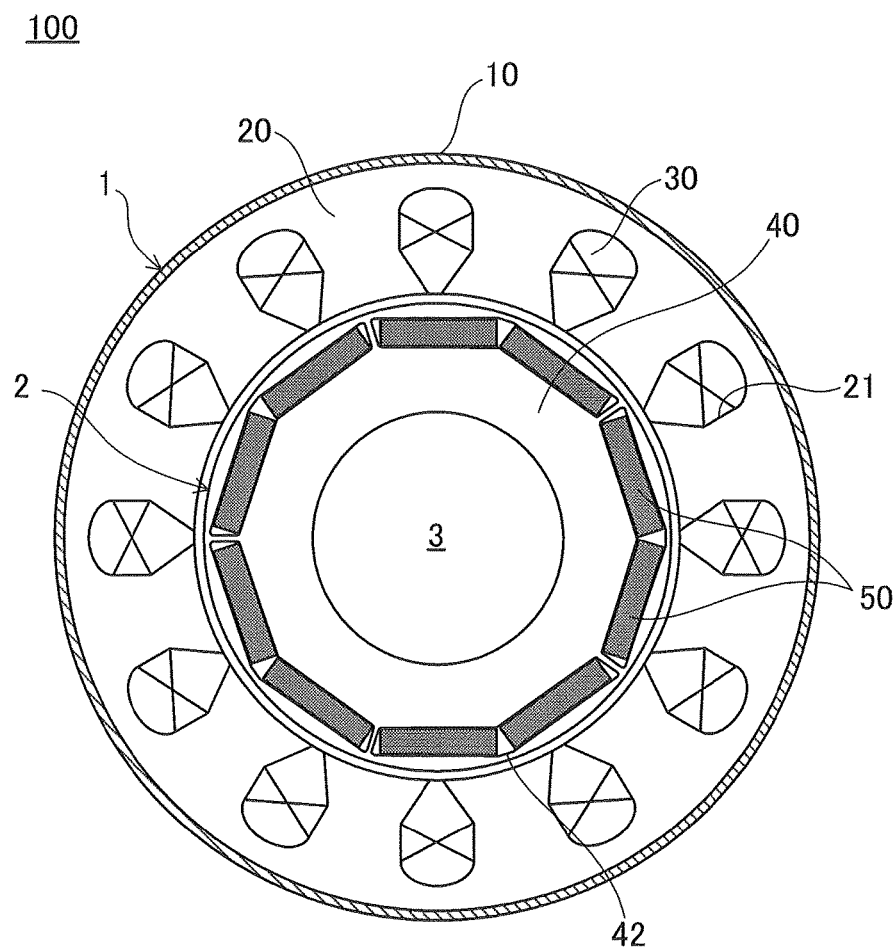
FIG. 1 is a cross-sectional schematic view of a permanent magnet-embedded motor according to a first embodiment.
Figure 2A:
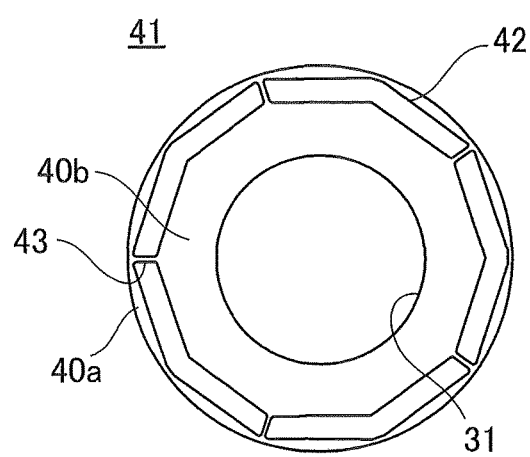
Figure 2B:
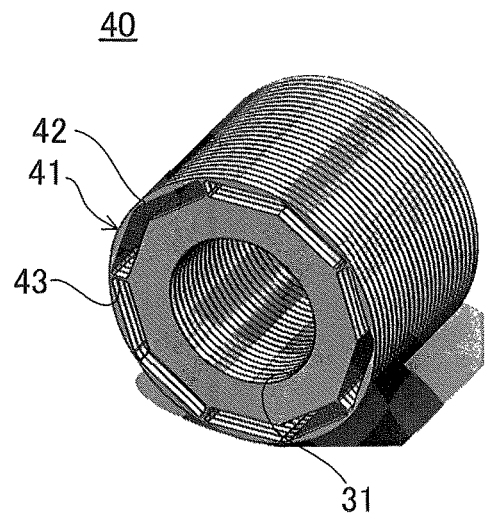
Figure 2C:
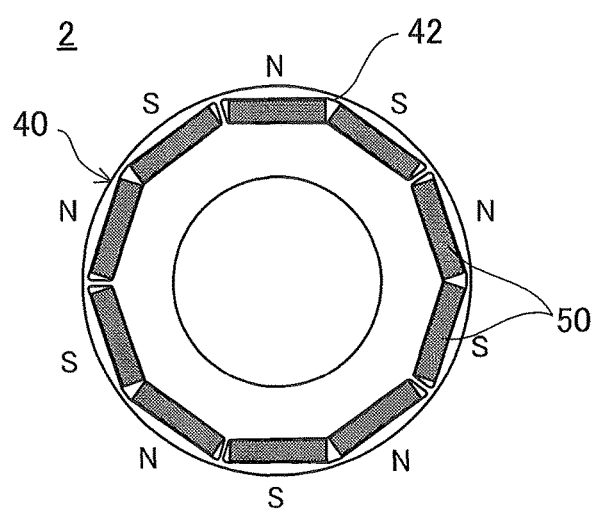

First, description is given for the structures of a permanent magnet-embedded motor and a rotor thereof with reference to FIGS. 1 to 2C. FIG. 1 is a cross-sectional schematic view of a permanent magnet-embedded motor according to a first embodiment. FIGS. 2A, 2B, and 2C are views for describing the rotor of the permanent magnet-embedded motor according to the first embodiment. FIG. 2A is a front view of a rotor core sheet, FIG. 2B is a perspective view of a rotor core, and FIG. 2C is a view illustrating the embedded permanent magnets.

The permanent magnet-embedded motor according to the present embodiment is generally called an interior permanent magnet (IPM) motor. A permanent magnet-embedded motor 100 illustrated in FIG. 1 is, for example, a 10-pole 12-slot IPM motor, which includes a stator 1 and a rotor 2.

As illustrated in FIG. 1, the stator 1 includes a yoke 10, a stator core 20, and a coil 30.

The yoke 10 is a cylindrical metallic member. The yoke 10 has a function of maximizing the effects of electromagnetic induction of a permanent magnet 50, which will be described below, by closing a line of magnetic force. Also, the yoke 10 has another function of preventing peripheral equipment of the motor 100 from being affected by the magnetic field caused by electromagnetic induction.

The yoke 10 is formed of, for example, a soft magnetic material such as a silicon steel sheet, but the material is not limited thereto.

The stator core 20 is a thick cylindrical metallic member provided along an inner surface of the yoke 10. A plurality of slots 21 is separately formed, as a space for housing the coils 30, in a radial direction on an inner periphery side of the stator core 20 so as to face the rotor 2. A form of the slot illustrated in FIG. 1 is only an example, and the form is not limited thereto.

The stator core 20 is formed of, for example, a soft magnetic material such as a silicon steel sheet, same as the yoke 10. However, the material is not limited thereto.

The coil 30 is arranged inside the slot 21. The number of slots 21 corresponds to that of the coils 30. In the present embodiment, twelve slots 21 and twelve coils 30 are provided. However, the number of the slots 21 and that of the coils 30 are not limited thereto.

The rotor 2 is provided around a rotating shaft 3 and includes a rotor core 40 and permanent magnets 50. The rotating shaft 3 is the center of rotation of the rotor 2.

The rotor core 40 is a thick cylindrical metallic member provided around the rotating shaft 3. The rotor core 40 has a stack structure in which a plurality of ring-shaped rotor core sheets 41 is laminated in an axial direction as illustrated in FIGS. 2A and 2B.

The rotor core 40 is formed of, for example, a soft magnetic material such as a silicon steel sheet, same as the yoke 10 and the stator core 20. However, the material is not limited thereto.

A circular shaft insertion hole 31, to which the rotating shaft 3 is fitted, is formed in the center of each rotor core sheet 41.

A plurality of magnet housings 42 is formed in the vicinity of an outer peripheral portion of each rotor core sheet 41 in order to house the permanent magnets 50. The magnet housings 42 are evenly arranged in a circumferential direction.

An outer peripheral portion 40a of the rotor core and an inner peripheral portion 40b of the rotor core are connected via a rib portion 43. The rib portion 43 is positioned between adjacent magnet housings 42.

The rib portion 43 connecting the outer peripheral portion 40a of the rotor core with the inner peripheral portion 40b of the rotor core is arranged per plurality of magnetic poles.

The rib portion 43 according to the present embodiment is arranged per two magnetic poles. Therefore, the magnet housing 42 is widely V-shaped on the rotor core sheet 41 because the magnet housing 42 includes two magnet housings for two magnetic poles in the related art, where the two magnet housings communicate with each other.

The permanent magnets 50 are embedded in the magnet housings 42 which are evenly arranged in a circumferential direction of the rotor core 40. As illustrated in FIG. 2C, two permanent magnets 50 are arranged in each of the magnet housings 42 so that the north pole and the south pole are disposed on the outer peripheral side.

The permanent magnet 50 is formed in a rectangular parallelepiped shape (the axial cross section is rectangular-shaped). According to the present embodiment, permanent magnets 50 including 10 poles are arranged. However, the number of the permanent magnets 50 is not limited thereto.

The permanent magnet 50 may be formed of, for example, a rare earth magnet such as a neodymium magnet. However, the material is not limited thereto.

<Effects Provided by Permanent Magnet-Embedded Motor and Rotor>

Next, effects provided by the permanent magnet-embedded motor 100 according to the first embodiment and the rotor 2 thereof will be described with reference to FIGS. 1 to 3B and 7A to 7C.

As illustrated in FIG. 1, the permanent magnets 50 are embedded in the magnet housings 42 which are evenly arranged in a circumferential direction of the rotor core 40 in the rotor 2 of the permanent magnet-embedded motor 100 according to the present embodiment. In the respective magnet housings 42, two permanent magnets 50 are embedded. The plurality of permanent magnets 50 is arranged so that the north pole and the south pole are alternately disposed on the outer peripheral side.

Meanwhile, the stator 1 is arranged so as to surround the rotor 2 and includes a plurality of coils 30 disposed radially in a circumferential direction.

More specifically, in the permanent magnet-embedded motor 100 according to the present embodiment, electric current flows to the coil 30 of the stator 1 so as to cross the magnetic flux generated by the permanent magnet 50 of the rotor 2. When the magnetic flux of the permanent magnet 50 crosses the electric current flowing to the coil 30, the permanent magnet-embedded motor 100 according to the present embodiment generates driving force in a circumferential direction by the action of electromagnetic induction and rotates the rotor 2 around the rotating shaft 3.

In the first embodiment, the rib portion 43 connecting the outer peripheral portion 40a of the rotor core with the inner peripheral portion 40b of the rotor core is arranged per two magnet poles. More specifically, two permanent magnets 50 are embedded in each of the magnet housings 42 so that the north pole and the south pole are alternately disposed on the outer peripheral side.

Figure 7A:
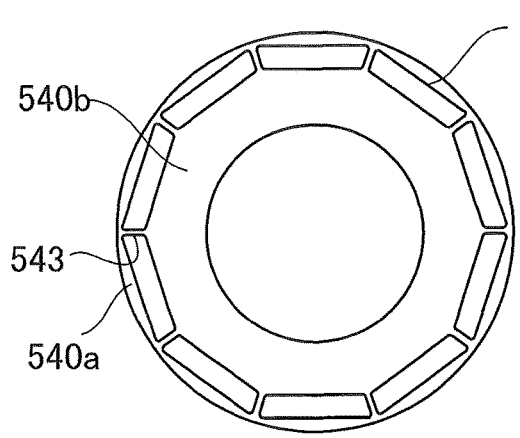
Figure 7B:
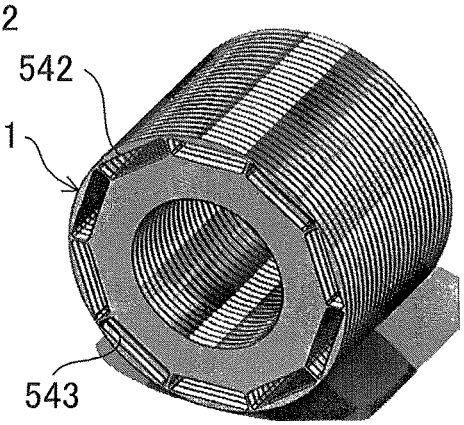
Figure 7C:
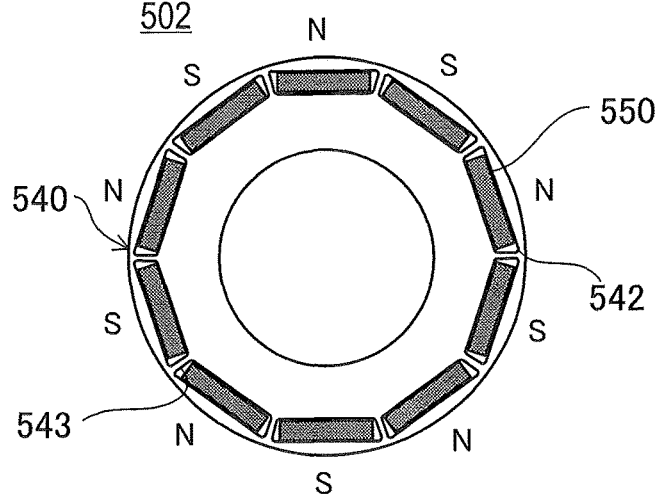

Here, a rotor having the structure in the related art will be described with reference to FIGS. 7A to 7C. FIGS. 7A to 7C are views for describing the rotor of a permanent magnet-embedded motor having the structure in the related art. FIG. 7A is a front view of a rotor core sheet, FIG. 7B is a perspective view of a rotor core, and FIG. 7C is a view illustrating the embedded permanent magnets.

As illustrated in FIGS. 7A to 7C, the rotor 502 having the structure in the related art includes, for example, permanent magnets 550 having 10 poles inside a rotor core 540. A magnet housing 542 is formed for each of the permanent magnets 550. That is, one permanent magnet 550 is embedded in each of the magnet housings 542.

Therefore, a rib portion 543 connecting an outer peripheral portion 540*a* of the rotor core with an inner peripheral portion 540*b* of the rotor core is arranged for each magnetic pole.

Figure 3A:
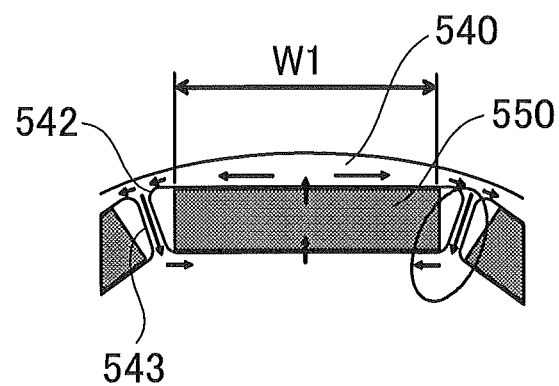
Figure 3B:
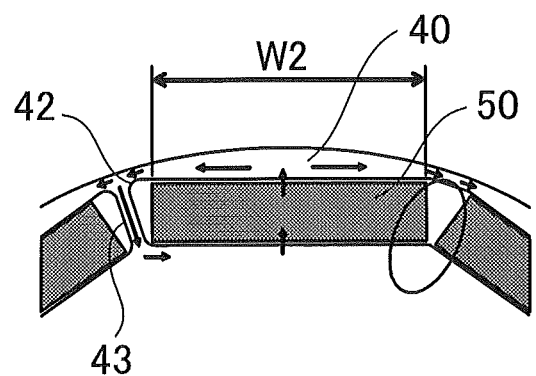

FIGS. 3A and 3B are views illustrating the flows of short-circuit fluxes of the permanent magnets and the widths of the permanent magnets, to compare the rotor core form according to the structure in the related art with the rotor core form according to the first embodiment.

As illustrated in FIGS. 3A and 3B, both permanent magnets 50, 550 have two main magnetic paths: the one passing near the outer periphery of the rotor cores 40, 540 and short-circuiting to the adjacent permanent magnets 50, 550; and the other one passing the rib portions 43, 543 and short-circuiting to the same permanent magnets 50, 550.

In the rotor core form according to the structure in the related art in FIG. 3A, there are four short-circuited magnetic paths for one permanent magnet 550, including the right and left magnetic paths.

In contrast, in the rotor core form according to the first embodiment in FIG. 3B, one of the short-circuited magnetic paths may be eliminated because two permanent magnets 50 are arranged in each of the magnet housings 42. Therefore, the number of the short-circuited magnetic paths in the rotor core form according to the first embodiment may be reduced to three quarters in comparison with the structure in the related art.

Further, in the rotor core form according to the first embodiment, the number of the rib portions 43 may be reduced to a half of the structure in the related art because two permanent magnets 50 are arranged in each of the magnet housings 42. Since no rib portion exists between the two permanent magnets 50, 50 housed in the same magnet housing 42, a width W2 of an insertable permanent magnet 50 can be made larger than a width W1 of the permanent magnet 550 according to the structure in the related art. By increasing the width W2 of the permanent magnet 50, the amount of magnetic flux of the permanent magnet 50 may be increased.

According to the permanent magnet-embedded motor 100 and the rotor 2 thereof in the first embodiment, the rib portion 43 connecting the outer peripheral portion 40*a* of the rotor core with the inner peripheral portion 40*b* of the rotor core is arranged per two magnetic poles, whereby the short-circuit flux may be reduced and the amount of magnetic flux of the permanent magnet 50 may be further increased in comparison with the structure in the related art. Therefore, the permanent magnet-embedded motor 100 according to the first embodiment and the rotor 2 thereof may improve the torque without increasing the manufacturing cost.

Second Embodiment

Figure 4A:
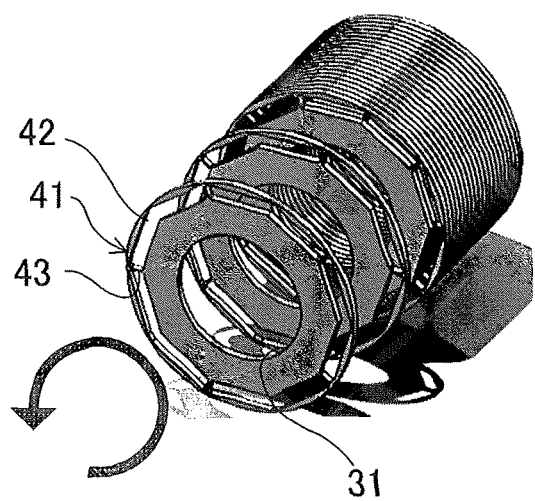
Figure 4B:
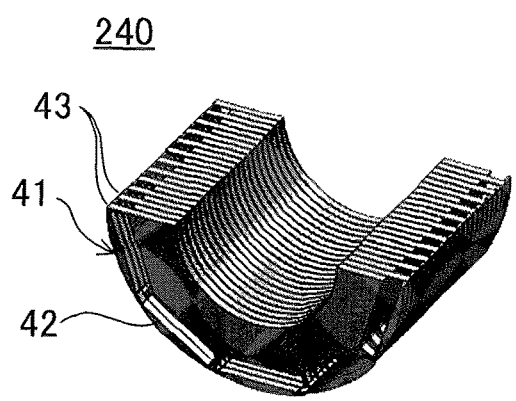
Figure 4C:
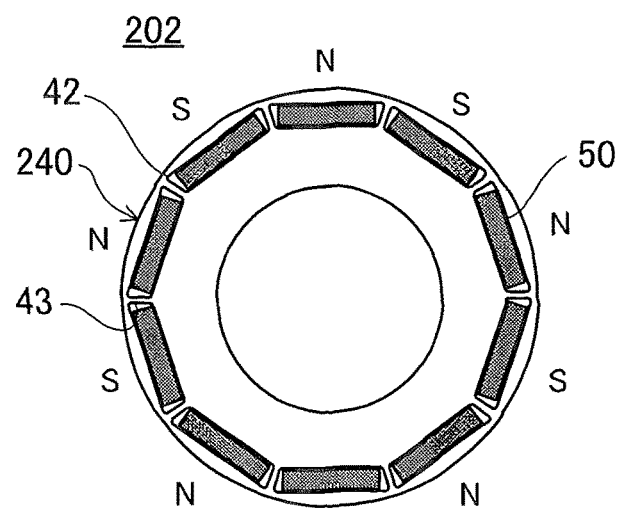

Next, the configuration of a rotor of a permanent magnet-embedded motor according to a second embodiment will be described with reference to FIGS. 4A to 4C. FIGS. 4A, 4B, and 4C are views for describing the rotor of the permanent magnet-embedded motor according to the second embodiment. FIG. 4A is a perspective view of a rotor core sheet, FIG. 4B is a perspective view of a half-cut rotor core, and FIG. 4C is a view illustrating the embedded permanent magnets. Note that this embodiment will be described, denoting the same components as those in the first embodiment by the same reference symbols. Further, repetition of the same description will be omitted by simply denoting the same components by the same reference symbols.

A rotor 202 of a permanent magnet-embedded motor according to the second embodiment differs from that of the first embodiment in the laminate structure of a rotor core sheet 41. The form of the rotor core sheet 41 is the same as that of the first embodiment (refer to FIG. 2A).

The rotor core sheets 41 according to the second embodiment are laminated by executing "rotational buildup" in which the rotor core sheets 41 are rotated around the shaft and laminated for each of the magnetic poles. As the rotor core sheets 41 are rotated and laminated for each of the magnetic poles, a rib portion 43 is formed on every other rotor core sheet in an axial direction.

Since the rib portion 43 is formed on every other rotor core sheet in the axial direction, the width of a permanent magnet 50 becomes smaller than that of the first embodiment and equal to that of the structure in the related art, constrained by the rib portion 43.

However, a cross-sectional area of the rib portion 43, where the short-circuit flux passes, is reduced by half of the structure in the related art. Therefore, the rib portion 43 obtains more increased magnetic resistance, and the amount of short-circuit flux may be reduced.

Basically, the rotor 202 of the permanent magnet-embedded motor according to the second embodiment provides the effects similar to those of the first embodiment. The rotor 202 of the permanent magnet-embedded motor according to the second embodiment provides a unique effect that the rotor core 240 may obtain the improved strength against centrifugal force with more rigidity although the torque becomes lower than that in the first embodiment.

Third Embodiment

Figure 5A:
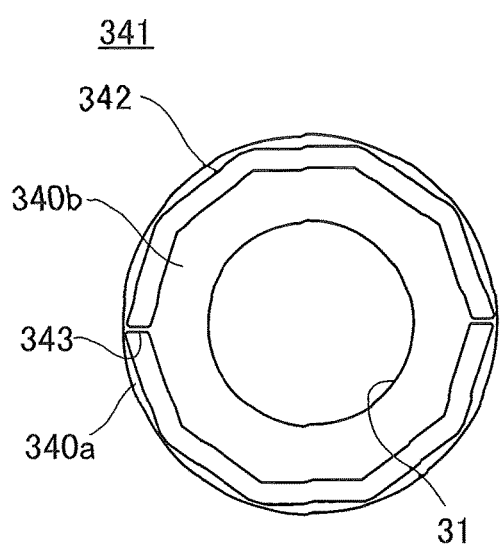
Figure 5B:
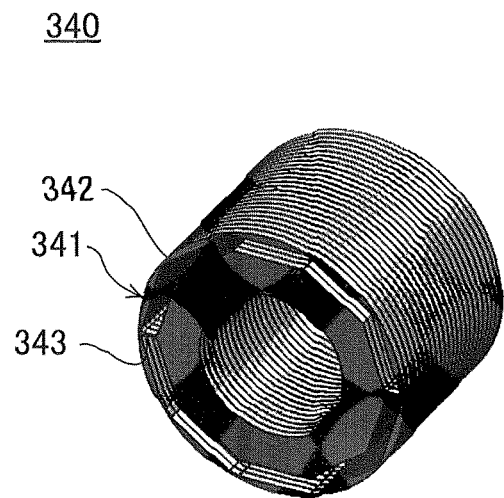
Figure 5C:
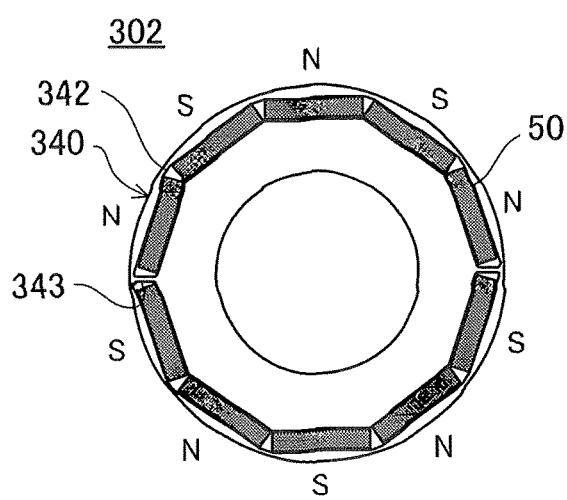

Next, the configuration of a rotor of a permanent magnet-embedded motor according to a third embodiment will be described with reference to FIGS. 5A to 5C. FIGS. 5A, 5B, and 5C are views for describing the rotor of the permanent magnet-embedded motor according to the third embodiment. FIG. 5A is a front view of a rotor core sheet, FIG. 5B is a perspective view of a rotor core, and FIG. 5C is a view illustrating the embedded permanent magnets. Note that the embodiment will be described, denoting the same components as those in the first embodiment by the same reference symbols. Further, repetition of the same description will be omitted by simply denoting the same components by the same reference symbols.

A rotor 302 of the permanent magnet-embedded motor according to the third embodiment differs from that of the first embodiment in the form of a magnet housing 342 in a rotor core sheet 341. In the rotor core sheet 341 according to the third embodiment, the magnet housings that house five magnetic poles of the related art communicate with one another. In the magnet housing 342, the permanent magnets 50 for five magnetic poles are arranged. A rib portion 343 connecting an outer peripheral portion 340*a* of the rotor core with an inner peripheral portion 340*b* of the rotor core is arranged per five magnetic poles.

The rotor core 340 according to the third embodiment is not formed by laminating the rotor core sheets 341 through rotary lamination (rotational buildup). Accordingly, the magnet housings 342 are located in the same position in the respective laminated rotor core sheets 341.

The permanent magnet 50 is formed in a rectangular parallelepiped shape (the cross section is rectangular-shaped in an axial direction) as in the first embodiment. Therefore, five permanent magnets 50 are arranged in one magnet housing 342 so that the north pole and the south pole are alternately disposed on the outer periphery side.

Since the rib portion 343 is provided per five magnetic poles, the number of short-circuited magnetic paths may be reduced to three fifths in comparison with the structure in the related art.

Also, since there is no constraint of the rib portion 343, the width of a permanent magnet 50 to be inserted may be set large and it becomes possible to further improve the torque.

The rotor 302 of the permanent magnet-embedded motor according to the third embodiment basically provides the effects similar to those in the first embodiment.

Particularly, the rotor 302 of the permanent magnet-embedded motor according to the third embodiment provides a unique effect in which the torque may be significantly improved because of the reduced short-circuit flux and the larger width of the permanent magnet 50.

Fourth Embodiment

Figure 6A:
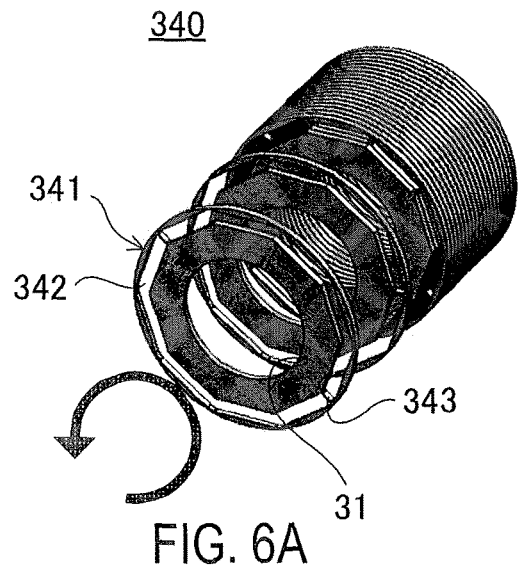
Figure 6B:
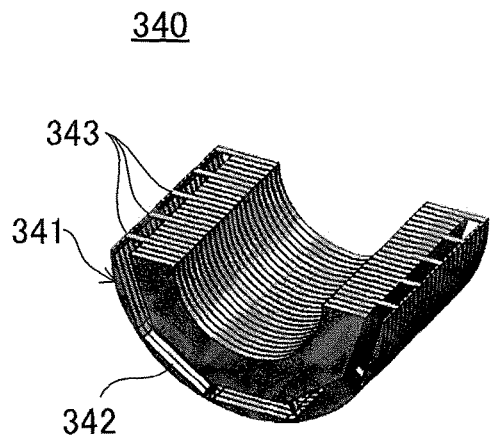
Figure 6C:
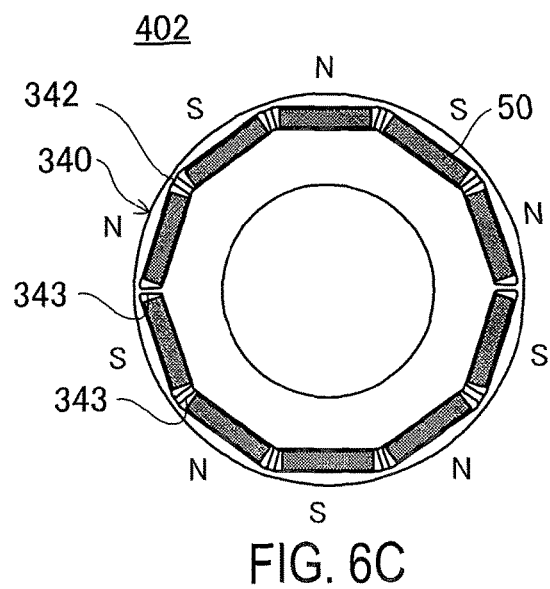

Next, the configuration of a rotor of a permanent magnet-embedded motor according to a fourth embodiment will be described with reference to FIGS. 6A to 6C. FIGS. 6A, 6B, and 6C are views for describing the rotor of the permanent magnet-embedded motor according to the fourth embodiment. FIG. 6A is a perspective view of a rotor core sheet, FIG. 6B is a perspective view of a half-cut rotor core, and FIG. 6C is a view illustrating the embedded permanent magnets. Note that the embodiment will be described, denoting the same components as those in the first and third embodiments by the same reference symbols. Further, repetition of the same description will be omitted by simply denoting the same components by the same reference symbols.

A rotor 402 of the permanent magnet-embedded motor according to the fourth embodiment differs from that of the third embodiment in that the rotor core sheets 341 are laminated around a shaft through rotary lamination (rotational buildup). The form of the rotor core sheet 341 is the same as that of the third embodiment (refer to FIG. 5A).

The rotor core sheets 341 according to the fourth embodiment are, as illustrated in FIG. 6A, laminated through rotary lamination (rotational buildup) around the shaft for each magnetic pole. As the rotor core sheets 341 are laminated through rotational buildup around the shaft for each magnetic pole, as illustrated in FIG. 6B, a rib portion 343 is formed on every five rotor core sheets in an axial direction.

Since the rib portion 343 is formed on every five rotor core sheets in the axial direction, the width of a permanent magnet 50 becomes smaller than that of the third embodiment and equal to that of the structure in the related art, constrained by the rib portion 343.

However, the rib portion 343 is provided for every five rotor core sheets in the axial direction and the cross-sectional area of the rib portion 343 where the short-circuit flux passes is reduced to one fifth. As a result, the rib portion 343 obtains more increased magnetic resistance, and the amount of short-circuit flux may be reduced.

The rotor 402 of the permanent magnet-embedded motor according to the fourth embodiment provides the effects similar to those in the third embodiment. The rotor 402 of the permanent magnet-embedded motor according to the fourth embodiment provides a unique effect in which the rotor core 340 may obtain the improved strength against centrifugal force with more rigidity although the torque becomes lower than that of the third embodiment due to the smaller width of the permanent magnet.

The preferred embodiments of the present invention have been described above, but the embodiments are merely the examples for describing the present invention and not intended to limit the scope of the present invention to the above embodiments. The present invention may be implemented in various aspects different from the above-described embodiments without departing from the gist of the present invention.

What is claimed is:

1. A rotor of a permanent magnet-embedded motor, comprising:
   a stack of plurality of core sheets, each including a plurality of magnet housings in a plane of a rotor core perpendicular to a central axis of the core;
   a plurality of permanent magnets in at least one magnet housing of the plurality of core sheets, such that a plurality of magnet poles is arranged in the at least one magnet housing in a circumferential direction of the rotor core; and
   a plurality of rib portions connecting an outer peripheral portion of the rotor core with an inner peripheral portion of the rotor core, each of the rib portions is provided between adjacent ones of the magnet housings, each of the rib portions being separated in a circumferential direction by more than two of the magnetic poles;
   each end of each magnet housing have a triangular shape, wherein end magnets in the magnetic housing define one side of the triangular shape;
   the plurality of core sheets being positioned amongst a plurality of different angular positions about the central axis, the angular positions being such that the rib portions of a particular one of the core sheets do not align with the rib portions of an adjacent one of the core sheets.

2. The rotor of a permanent magnet-embedded motor according to claim 1, wherein the rotor core has a stack structure in which a plurality of rotor core sheets is laminated in an axial direction of a rotating shaft.

3. The rotor of a permanent magnet-embedded motor according to claim 1, wherein a plurality of rotor core sheets is rotated around a shaft and laminated at least for each magnetic pole.

4. A permanent magnet-embedded motor, comprising the rotor according to claim 1 provided in a stator including a coil.

5. The rotor of claim 1, wherein no pathway between the outer peripheral portion of the rotor core and the inner peripheral portion of the rotor core is provided through the at least one magnet housing.

6. The rotor of claim 1, wherein each of the rib portions is separated by five of the magnetic poles.

7. The rotor of claim 1, wherein the permanent magnets are arranged in the magnet housing so that their north poles and their south pole are alternately disposed on an outer periphery side around the entire rotor.

8. A rotor of a permanent magnet-embedded motor, comprising:
   a stack of plurality of core sheets, each including a plurality of magnet housings in a plane of a rotor core perpendicular to a central axis of the core;
   a plurality of permanent magnets in at least one magnet housing of each of the plurality of core sheets, such that a plurality of magnet poles is arranged in the at least one magnet housing in a circumferential direction of the rotor core; and a plurality of rib portions connecting an outer peripheral portion of the rotor core with an inner peripheral portion of the rotor core, each of the rib portions is provided between adjacent ones of the magnet housings, each of the rib portions being separated in a circumferential direction by more than two of the magnetic poles;

the plurality of core sheets being positioned amongst a plurality of different angular positions about the central axis, the angular positions being such that the rib portions of a particular one of the core sheets do not align with the rib portions of an adjacent one of the core sheets.

9. The rotor of claim 8, wherein there are two magnetic housings, each magnetic housing accommodates five of the magnets, and two ribs separate the two magnetic housings, and there are five different angular positions.

10. The rotor of claim 8, wherein short-circuit flux passing through each of the rib portions of the core sheets is 1/n compared to if the core sheets were positioned at a same angular position, where n is the number of magnets accommodated in the at least one magnetic housing.

11. The rotor of claim 9, wherein short-circuit flux passing through the rib portions of the core sheets is ⅕ compared to if the core sheets were position at a same angular position.

12. The rotor of claim 1, wherein a space between adjacent ends of adjacent ones of the magnetic housings has a uniform distance between the adjacent ends.

\* \* \* \* \*